United States Patent [19]

Tsou

[11] 4,056,493
[45] Nov. 1, 1977

[54] TRIMELLITIC ANHYDRIDE MODIFIED URETHANE ELECTROCOATING RESINS

[75] Inventor: Ivan H. Tsou, Bloomfield Hills, Mich.

[73] Assignee: Ford Motor Company, Dearborn, Mich.

[21] Appl. No.: 448,161

[22] Filed: Mar. 4, 1974

Related U.S. Application Data

[60] Continuation-in-part of Ser. No. 316,320, Dec. 29, 1972, abandoned, which is a division of Ser. No. 75,748, Sept. 25, 1970, Pat. No. 3,709,846, which is a continuation-in-part of Ser. No. 733,187, April 24, 1968, abandoned, which is a continuation-in-part of Ser. No. 363,814, April 30, 1965, abandoned, and Ser. No. 734,825, April 24, 1968, abandoned.

[51] Int. Cl.$^2$ ............................................. C08G 18/12
[52] U.S. Cl. ........................ 260/22 TN; 260/18 TN; 260/23 TN; 260/29.2 TN; 204/181
[58] Field of Search ................. 260/18 TN, 29.2 TN, 260/22 TN, 23 TN

[56] References Cited

U.S. PATENT DOCUMENTS

| | | | |
|---|---|---|---|
| 3,419,510 | 12/1968 | Hudak | 260/22 |
| 3,477,977 | 11/1969 | Schnell et al. | 260/29.2 |
| 3,539,482 | 11/1970 | Stewart | 260/29.2 |
| 3,607,800 | 9/1971 | Sekmakas | 260/29.2 |
| 3,709,846 | 1/1973 | Tsou | 260/18 |
| 3,736,216 | 5/1973 | Trimble et al. | 260/29.2 |

*Primary Examiner*—Eugene C. Rzucidlo
*Attorney, Agent, or Firm*—Olin B. Johnson; Keith L. Zerschling

[57] ABSTRACT

A novel coating bath composition for anodic deposition of paint comprises on a pigment and particulate filler-free basis, an aqueous dispersion of a water-soluble base, and a unique polycarboxylic acid formed by (a) reacting 1 molar part of a triol with 1 molar part of an acyclic, olefinically unsaturated monocarboxylic acid of about 18 carbon atoms, (b) reacting the product of (a) with 2 molar parts of a diisocyanate, (c) reacting the product of (b) with 2 molar parts of a diol or triol, and (d) reacting the product of (c) with about 0.5 to about 2 molar parts of trimellitic anhydride.

1 Claim, No Drawings

TRIMELLITIC ANHYDRIDE MODIFIED URETHANE ELECTROCOATING RESINS

This application is a continuation-in-part of copending application Ser. No. 316,320 filed Dec. 29, 1972, and now abandoned, which in turn is a divisional application of application Ser. No. 75,748 filed Sept. 25, 1970 with which it was copending. Application Ser. No. 75,748 was in turn a continuation-in-part of application Ser. No. 733,187 filed Apr. 24, 1968 with which it was copending. Application Ser. No. 733,187 was in turn a continuation-in-part of applications Ser. No. 363,814 filed Apr. 30, 1965 and Ser. No. 734,825 filed Apr. 24, 1968 with which it was copending. All of the aforementioned patent applications, excepting application Ser. No. 316,320 and application Ser. No. 75,748 are now abandoned. Application Ser. No. 75,748 issued as U.S. Pat. 3,709,846 on Jan. 9, 1973.

BACKGROUND OF THE INVENTION

Electrically induced deposition of a paint comprising pigment and a polycarboxylic acid resin provides an effective means for placing a coating of uniform depth upon all exposed areas of metal articles, including those having recessed or irregularly shaped surfaces. This process is exemplified in the art by Gilchrist, U.S. Pat. No. 3,230,162.

Large scale coating operations require that the coating materials employed in such process provide a physically and chemically stable coating bath, i.e., a bath that will permit continuous or intermittent addition of replacement feed, provide a uniform, blemish-free film, and, when applied to articles subjected to outdoor exposure, a high level of corrosion protection after conventional treatment to effect heat curing.

Preferably, the coating material for use in this process is one that requires a minimum of electrical energy to provide a film of acceptable thickness in a minimum of time upon the most inaccessible and/or electrically shielded surfaces of the workpiece. The degree to which a given coating material possesses this characteristic in relation to other coating formulations under like conditions is termed the "throw" or "throwing power" of the formulation.

THE INVENTION

This invention is concerned with novel and superior coating materials for use in the aforedescribed painting process and to a coating bath containing the same. This bath will ordinarily include a particulate pigment, a watersoluble base, preferably a water-soluble amine, although other bases such as ammonium hydroxide, potassium hydroxide, lithium hydroxide, etc., may be used, and a polycarboxylic acid binder resin.

At least the predominant fraction of the film-forming paint binder resin of this coating bath is a polycarboxylic acid resin having an acid number above about 20, preferably in the range of about 35 to about 75, although resins with higher acid numbers can be used, e.g., 75 to 150. The carboxylic acid resin of this bath composition derives a major proportion of its acidity, i.e., free-carboxyl groups, from trimellitic anhydride. It will be understood by those skilled in the art that the polycarboxylic acid resin may also have dissociable monocarboxylic acid groups in its molecular structure other than those contributed by the trimellitic anhydride. The urethane linkages of the carboxylic acid resin of this invention are derived from the reaction of a diisocyanate and polyhydric alcohols. More specifically, the polycarboxylic acid resins of the unique coating bath compositions of this invention are formed by (a) reacting 1 molar part of a triol with 1 molar part of an acyclic, olefinically unsaturated monocarboxylic fatty acid of about 18 carbons, (b) reacting the product of (a) with 2 molar parts of a diisocyanate, (c) reacting the product of (b) with 2 molar parts of a triol or diol, and (d) reacting the product of (c) with about 0.5 to about 2 molar parts of trimellitic anhydride.

The $C_{18}$ olefinically unsaturated, monocarboxylic acids existing in or derived from products of nature are plentiful and suitable for use in preparing the carboxylic acid resins of this invention, i.e., fatty acids derived from linseed oil, soya bean oil, hempseed oil, walnut seel oil, perilla oil, castor oil, sardine oil, menhaden oil, etc. Particularly suitable are the drying oil fatty acids obtained as a mixture of individual acids by hydrolysis of natural drying oils such as linseed oil, soya bean oil, perilla oil and the like. Also, the unsaturated fatty acids obtained by hydrolysis of drying oils which have been treated so as to effect conjugation of the double bonds, as by alkali isomerization, are very suitable.

The triols which are suitable for use with this invention include $C_3$–$C_7$ triols consisting essentially of carbon, hydrogen and oxygen, e.g., glycerine, trimethylolbutane, trimethylolethane and trimethylolpropane.

The diols which are suitable for use with this invention include $C_4$–$C_8$ diols consisting essentially of carbon, hydrogen and oxygen, e.g., diethylene glycol, 1,3 - butylene glycol, 1,6 - hexane diol, neopentyl glycol, 1,4 - dimethylol cyclohexane, and 1,4 - cyclohexanemethanol.

The diisocyanates suitable for use with this invention include toluene diisocyanate, 4,4' - diphenylmethane diisocyanate, 4,4' - dicyclohexane diisocyanate, isophorone diisocyanate, Desmudur - N, a trade name of Mobay Chemical Co., a division of Baychem Corp., Pittsburg, Pa. for a high molecular weight biuret containing polyisocyanate obtained by reacting 3 moles hexamethylene diisocyanate with 1 mole of water.

The reaction of the olefinically unsaturated, monocarboxylic acids with hydroxyl groups of a polyol is a conventional esterification reaction. This reaction is carried out at a temperature in the range of about 199° C (390° F) to about 232° C (450° F), preferably about 207° C (415° F) to about 221° C (430° F). A catalyst, e.g., calcium napthenate, lithium resinoleate or litharge, in the amount of about 0.1 to about 0.5% by weight of reactants, may be employed to accelerate the reaction. Preferably, however, the reaction is carried out without a catalyst under an inert gas, e.g., nitrogen or carbon dioxide, which is also used to purge the condensate water formed in the esterification reaction.

The reaction mixture is advantageously allowed to cool to 40° C or less prior to introducing the diisocyanate.

The urethane-forming reaction of the isocyanate groups of the diisocyanate with hydroxyl groups of a polyol is a conventional addition reaction. This reaction is carried out at a temperature in the range of about 20° C to 75° C. The diisocyanate is introduced slowly and a slight exotherm results. The temperature can be controlled by the rate of addition of the diisocyanate supplemented by external cooling. A preferred temperature range is about 30° to about 50° C. A catalyst such as dibutyl tin dilaurate in the amount of about 0.1 to about 0.2 weight percent (basis weight of reactants)

may be mixed with a non-reactive solvent, e.g., xylene, introduced into the reaction mixture. The reaction temperature is maintained until essentially all of the hydroxyl groups are reacted. Completeness can be checked from time to time by standard analytical tests for unreacted isocyanate and thus determined by calculation the remaining hydroxyl groups to be reacted.

The test I prefer for determining the amount of unreacted isocyanate is made in the following manner: (1) prepare a test reagent by placing 259 grams of a 2 normal solution of dibutyl amine to a 1,000 ml flask, (2) prepare an indicator by dissolving 0.1 grams of Bromophenol Blue in 1.5 ml. of 0.1 normal NaOH and add 100 ml distilled water, (3) weigh out and place about 6 grams of the sample to be tested in a 500 ml flask, dilute with 25 ml of distilled toluene and set aside, (4) prepare a control by placing 25 ml of distilled toluene in a second 500 ml flask, (5) add to each flask 20 ml of the dibutyl amine and gently stir using a magnetic stirrer until the exotherm subsides and allow to cool, (6) add 100 cc of anhydrous isopropanol to each flask, (7) add 0.5 ml of the Bromophenol Blue indicator to each flask, (8) titrate by adding to each flask a standard 1 normal HCl solution to a yellow end point and calculate as follows - ml of HCl solution used for the control minus ml of HCl solution used for the test sample × 4.20 (constant) ÷ exact amount of grams of sample (e.g., 5.9–6.1) = free isocyanate % by weight of sample. This reaction is ordinarily complete in three hours or less. The reaction of the diol or triol with the second reaction step product is advisedly carried out under the same range of conditions heretofore recited for the first step reaction.

The reaction of trimellitic anhydride with hydroxyl groups of a polyol is a conventional esterification reaction. This reaction is herein carried out within a narrow temperature range, i.e., about 165° C (330° F) to about 168° C (335° F).

All reactions involved in preparing these polycarboxylic acid resins are preferably carried out at atmosphere pressure in an inert gas atmosphere.

Electrically induced deposition from an aqueous coating bath using the aforedescribed polycarboxylic acid resin if facilitated by exceptionally high throwing power. The two closely associated free carboxyl groups per acid molecule in these resins appears to account for there evidencing high chemical stability in both the coating bath and the deposited film. This permits their effective use in coating baths of greater basicity and reduces the requirements of pH control. The use of diisocyanates as reactants in the formation of the polycarboxylic acid resins provides the coatings thus obtained with abrasion resistance.

These resins may be admixed with conventional pigments, fillers, extenders, polymerizable monomers, etc. The resultant coating formulations are dispersed in the aqueous bath in amounts such as to provide about 2 to about 20, preferably about 5 to about 12 percent solids. They are effectively dispersed with conventional dispersal assistants for polycarboxylic acid resins, e.g., ammonia, ethanolamine, diethlamine, diethanolamine, triethanolamine, isopropanolamine diisopropanol amine, hydroxylamine, morpholine, N-methyl ethanolamine, etc. Non-volatile bases, e.g., potassium hydroxide, lithium hydroxide, etc., obviously can be used but the organic bases are preferred.

This invention will be more fully understood from the following illustrative examples:

EXAMPLE 1

A polyurethane paint binder resin is prepared from the following materials using the procedure hereinafter set forth:

| Materials | Mols | Grams |
| --- | --- | --- |
| Toluene diisocyanate | 2 | 350 |
| Glycerine | 3 | 300 |
| Soya fatty acids | 1 | 240 |

Procedure

About 1 mole of glycerin (100 g) and the soya fatty acids are charged to a stainless steel vessel equipped with reflux condenser, agitator, means for heating and cooling, a nitrogen inlet and charged with an inert atmosphere (dry nitrogen). This mix is heated to about 230° C (446° F) and maintained at this temperature until the acid number is below about 1. The reaction mix is cooled to about 40° C. To the reaction mix are slowly added 2 moles of toluene diisocyanate and the reaction mix is maintained at about 50°–60° C by the rate of addition and external cooling until the addition is complete. When addition is complete, the temperature is taken up to 75° C and held there for three hours to assure completion of the reaction.

After the three hour period, 2 moles of glycerine are added to the reaction mix (this component may also be a glycol) using the same procedure used in the addition of the diisocyanate to the glycerine fatty acid esterification product. Again, the temperature is maintained at 75° C for three hours after the addition is complete.

After this three hour period, one mole of trimellitic anhydride is added to the reaction mixture and the reaction mixture is heated to 165° C (330° F) and this temperature is maintained until the acid number is about 52. Isopropanol or other organic solvents conventional to electrodeposition of paint can be added at this point. The concentration of this solvent should not exceed 30 weight percent of the resin. This resin solution and diisopropanol amine are dispersed in water to provide a coating bath containing about 6 percent resin solids and having a pH of about 8.6. This resin is anodically deposited with the bath container serving as the cathode of the electrodeposition cell. Steel panels immersed in the bath are electrically charged and serve as anodes of the cell. Coating is carried out at 65° F at an impressed direct current potential of 350 volts. A uniform deposit is obtained on the panels. The panels are removed from the bath, rinsed with water, blown dry and baked for 15 minutes at 380° F.

EXAMPLE 2

The procedures of Examples 1 are repeated except for the difference that there are substituted 2 molar parts of diethyleneglycol for the 2 molar parts of glycerine which are reacted with the glycerine — fatty acid — diisocyanate reaction product.

The resin of this dispersion is anodically deposited upon metal objects as in the preceding example.

EXAMPLE 3

The procedure of Example 1 is repeated with the differences that in the first step reaction of glycerine with soya fatty acids the reaction is carried out at a temperature of about 221° C (430° F), the diisocyanate employed in the second step reaction of diisocyanate with the product of the first reaction is 4,4' - diphenylmethane diisocyanate, the polyol used in the third step reaction in lieu of glycerine is 1,4 - cyclohexanemethanol and the reaction of trimellitic anhydride with the reaction product of the third step reaction is carried out at a temperature of about 168° C (335° F).

EXAMPLE 4

The procedure of Example 1 is repeated with the differences that in the first step reaction of glycerine with soya fatty acids the reaction is carried out at a temperature of about 207° C (415° F), the diisocyanate employed in the second step reaction is 4,4' - dicyclohexane diisocyanate, and the polyol employed in the third step reaction in lieu of glycerine is 1,3 - butylene glycol.

EXAMPLE 5

The procedure of Example 1 is repeated with the differences that an equimolar amount of trimethylolbutane is substituted for the glycerine of the first step reaction an equimolar amount of isophorone diisocyanate is substituted for the toluene diisocyanate of the second step reaction and an equimolar amount of 1,6 - hexane diol is substituted for the glycerine in the third step reaction.

EXAMPLE 6

The procedure of Example 1 is repeated except for the differences that an equimolar amount of trimetholethane is substituted for the glycerine in the first step reaction, an equimolar amount of linseed fatty acids are substituted for the soya fatty acids in the first step reaction and an equimolar amount of neopentyl glycol is substituted for the glycerine in the third step reaction.

EXAMPLE 7

The procedure of Example 1 is repeated except for the differences that an equimolar amount of tall oil fatty acids are substituted for the soya fatty acids of the first step reaction.

EXAMPLE 8

The procedure of Example 1 is repeated except for the difference that in the fourth step reaction 0.5 moles of trimellitic anhydride are used instead of the 1 mole used in Example 1.

EXAMPLE 9

The procedure of Example 1 is repeated except for the difference that in the fourth reaction step 2 molar parts of trimellitic anhydride are used instead of the 1 mole used in Example 1.

The term "polycarboxylic acid resin" as employed herein means an organic resin having dissociable carboxyl groups in its molecular structure. Such a resin is formed by reacting a plurality of molecules of at least two different organic compounds of which at least one such compound is a carboxylic acid and wherein the reaction is such that one or more carboxyl groups from each molecule of such carboxylic acid remain as free or dissociable carboxyl groups when the resin is formed.

It will be understood by those skilled in the art that modifications can be made within the foregoing examples without departing from the scope of this invention as hereinbefore described and hereinafter claimed.

We claim:
1. In a bath composition for electrodepositing paint on an anode and comprising on a pigment and particulate fillerfree basis an aqueous dispersion of a film-forming, polycarboxylic acid paint binder resin at least partially neutralized with water-soluble base, the improvement wherein said polycarboxylic acid paint binder resin is formed by:
   a. reacting 1 molar part of glycerine with 1 molar part of an acyclic, olefinically unsaturated monocarboxylic fatty acid of about 18 carbon atoms at a temperature of about 230° C.
   b. reacting the product of (a) with 2 molar parts of toluene diisocyanate at a temperature of about 75° C.,
   c. reacting the product of (b) with 2 molar parts of diethylene glycol at a temperature of about 75° C., and
   d. reacting the product of (c) with about 0.5 to about 2 molar parts of trimellitic anhydride at a temperature of about 165° C.

* * * * *